Feb. 20, 1962 J. E. WALLS 3,022,032

ADJUSTABLE SUPPORTING DEVICE

Filed Aug. 8, 1960 2 Sheets-Sheet 1

INVENTOR

JAMES E. WALLS

BY Stone & Mack.

ATTORNEYS

Feb. 20, 1962 J. E. WALLS 3,022,032

ADJUSTABLE SUPPORTING DEVICE

Filed Aug. 8, 1960 2 Sheets-Sheet 2

INVENTOR

JAMES E. WALLS

BY Stone & Mack.

ATTORNEYS

United States Patent Office

3,022,032

Patented Feb. 20, 1962

3,022,032
ADJUSTABLE SUPPORTING DEVICE

James E. Walls, 3718 Elmora Ave., Baltimore 13, Md.

Filed Aug. 8, 1960, Ser. No. 47,996
6 Claims. (Cl. 248—205)

This invention relates to an apparatus for mounting telephone equipment or equipment similar thereto, that formerly may have been attached directly to a desk, upon a desk. In its broadest aspect it should be termed a desk mounting unit.

The apparatus is particularly adapted for use on desks that are provided with slab type legs which legs are solid and are placed beneath the desk cross-wise thereof, there being two such slab legs for each desk.

The apparatus is arranged to permit a telephone company employee to install telephone equipment upon a wooden, plastic or metal desk without boring holes in the desk for the securement of the equipment thereto, as has been customary heretofore. Such holes are unsightly should the telephone equipment be removed from the legs, sides, or facings of the desks. The telephone equipment usually includes connecting blocks, back-boards, bell boxes, inside wiring cables, etc.; all of which is essential in the installation and placing of a telephone upon a desk.

In my application Serial Number 812,608, filed May 12, 1959, now Patent Number 2,949,272, which issued August 16, 1960, I have shown an adjustable supporting device as it relates to a conventional desk which is supported by four vertically disposed legs.

The primary object of this invention is to provide a quickly detachable apparatus for mounting telephone equipment upon a desk provided with slab type legs.

A further object of the invention is to provide an apparatus which permits quick, easy, and certain installations and removals of telephone equipment from a desk.

Another object is to provide an apparatus whereby, in the course of moving a desk from place to place in a room, a subscriber may easily release the entire assemblage of telephone equipment from his desk without a complicated procedure and usually without seeking aid from a telephone company employee.

Still another object is to provide an apparatus which will permit the telephone company employee to assemble the equipment thereon, prior to his arrival at the point where the desk is situated.

Other objects of the invention will become readily apparent as the description of the invention proceeds.

The preferred embodiments of the invention are set forth in the following description and illustrated in the accompanying drawings, wherein.

Figures 1, 2, 3:
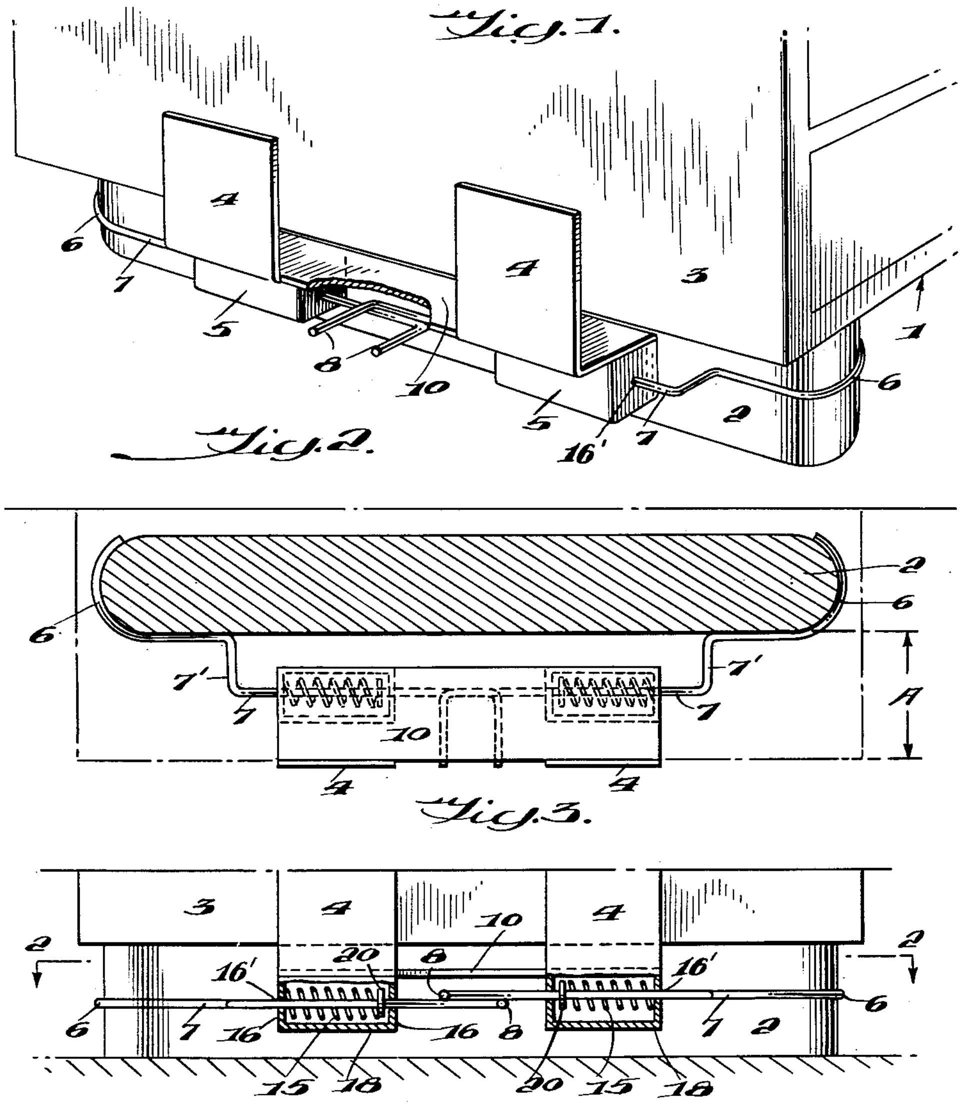
FIGURE 1 is a perspective view of a desk provided with slab legs illustrating a means, provided by this invention, for mounting the apparatus on the slab leg adjacent to the end panel of the desk.
FIGURE 2 is a horizontal sectional view taken on the line 2—2 of FIGURE 3.
FIGURE 3 is a partial vertical view of the end of the slab leg desk shown in FIGURE 1.
Figure 4:
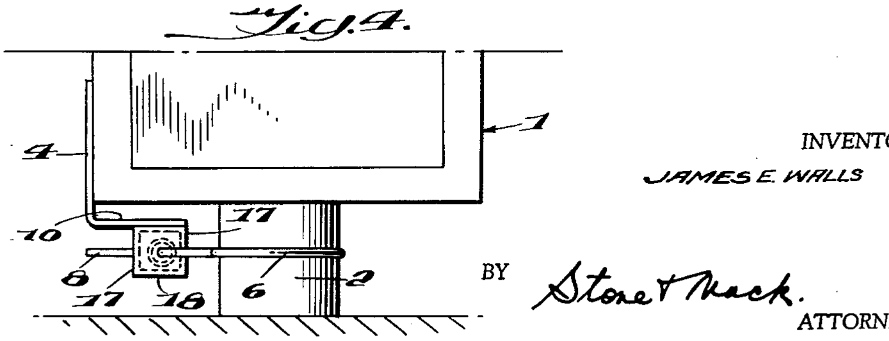
FIGURE 4 is a partial vertical view of the front surface of the slab leg desk shown in FIGURE 1.

In the accompanying drawings, a desk 1 having slab legs 2 (one only being shown) is shown. The telephone equipment referred to above, heretofore has usually been securely attached to the side panel 3 or knee well panel of the desk by means of screws and holes in said panels. In order to avoid marring of the desk and to provide a quickly mountable and demountable apparatus for holding the telephone equipment, reference is made to FIGURE 1 showing the apparatus completely assembled. The apparatus includes side plates 4, 4, dust covers or boxes 5, slab leg clamps 6, 6, operating rods 7, 7, and rod handles 8, 8.

The dust covers or boxes 5, 5 are joined together by a one-piece member 10, preferably made of sheet metal of rectangular shape and from which the side plates 4, 4 are upstruck should they be made integral with the member 10. The side plates 4, 4, could very readily be made as individual members having vertical and horizontal portions, the horizontal portion being adjustably mounted upon the one-piece base member 10. This is a modification of the invention as described which is not shown by the drawings. This variation is not shown because it is so obvious how it may be done. The plates 4, 4, are vertically disposed adjacent to the side panel 3 of the desk and press against the same. Should the horizontal portions of the plates be adjustably mounted upon the one-piece base member 10, they would then be adjustable inwardly or outwardly in a horizontal direction with respect to member 10 and with respect to the desk end 3. This is a modification of the invention as described which is not shown by the drawings. Any equivalent means may be provided for adjustably mounting the plates 4 on the member 10, provided the mounting is secure. Upon the plates 4 to the telephone equipment is mounted, either on the job or prior thereto.

The member 10 constitutes a coextensive top cover member also for dust covers or boxes 5, 5. These boxes each contain a spring 15 surrounding and supported by a rod 7, said rod passing through openings 16′ in the ends 16 of the box, and are slidably mounted in said ends. Each box is made of sheet meal and consists of side wall member 17, end members 16, said end members serving as abutment plates, a bottom member 18, and its respective portion of the one-piece member 10. The member 10, as shown, bridges, and forms a common coextensive top cover member for the boxes 5, 5, as well as providing a supporting base for the side plates 4, 4.

Referring to each box, the rod 7 therein terminates at one end in a handle 8 and is detachably secured at its other end 6 to the slab leg 2, as shown. Each rod is shaped as shown clearly in FIGURES 1 and 2. Each rod 7 is offset at 7′, the offset portion being directed inwardly toward the slab leg 2 and then the rod continues in a direction parallel to the slab leg abutting the same and terminating in the slab leg clamping portion 6, as shown. The slab leg clamping portion 6 is shown as being curved to conform to the contour of the end face of the slab leg, but it may take any form provided it can clamp to and conform readily to the slab leg. In FIGURE 2, attention is directed to reference character A representing the overhang or distance horizontally by which the end panel of the desk is removed from the outwardly disposed wall surface of the slab leg. It will be observed that the apparatus is mounted so that the plates 4, 4, fit snugly against the end panel 3 and for the most part entirely below the overhang A, so that the apparatus falls clearly within the horizontal dimensions of the desk.

As seen more clearly in FIGURE 3, the rod 7 in each box or dust cover is provided preferably with a stop 20 disposed on the rod and within the box, each stop being on that portion of the rod including the rod handle 8. Between each stop and the end of each box, that is, the end nearest to the clamp 6, the rod 7 supports and is surrounded by a spring 15, the stop and box end serving as abutments between which the spring is confined.

The apparatus just described is employed as follows. The telephone equipment is securely mounted on plates 4, 4. The apparatus is applied to the desk and to the slab legs by grasping handles 8, 8, and drawing them towards each other, thus compressing springs 15 and 15 and lengthening the distance between the leg clamps 6, 6. The proper position is then determined and when the handles 8, 8, are released, the slab leg clamps 6, 6 move towards each other and engage the leg 2, under the urging of the springs 15, 15. The springs are sufficiently strong to provide the needed drawing force upon the clamps 6, 6. Thus the clamps are adjustably carried by and form a part of the rods 7, 7 and are urged into position by springs 15, 15. The plates 4, 4, with the telephone equipment thereon are then adjusted to have a firm bearing against the desk panel 3.

The modification of the invention shown in FIGURES 5, 6, 7 and 8 has all of the principal aspects of the form of the invention just described and the manner of mounting and using the apparatus is identical to that just described. For the most part, the elements are the same and hence the same reference characters are employed as previously. Wherever changes in structure have been made, those changes will now be explained and reference thereto will be noted.

Figures 5, 6:
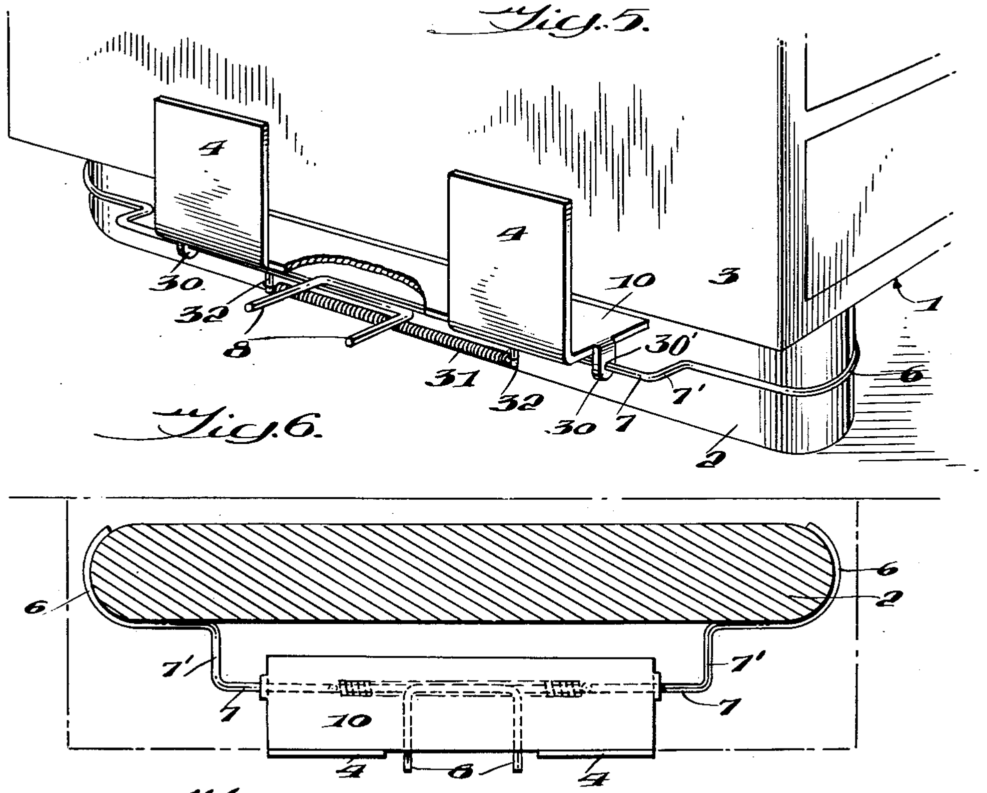
FIGURE 5 is a perspective view of a desk provided with slab legs illustrating a modified means, provided by this invention, for mounting the apparatus on the slab leg adjacent to the end panel of the desk.
FIGURE 6 is a horizontal sectional view taken on the line 6—6 of FIGURE 7.
Figure 7:
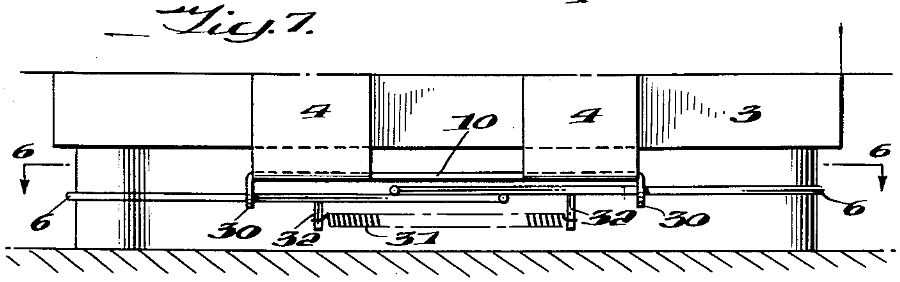
FIGURE 7 is a partial vertical view of the end of the slab leg desk shown in FIGURE 5.
Figure 8:
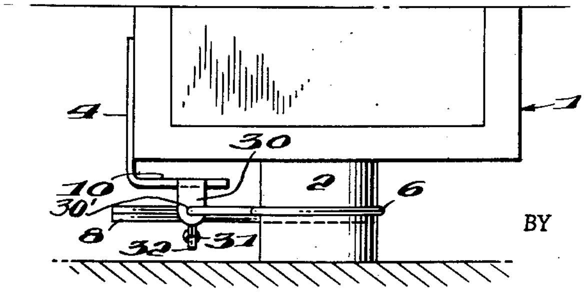
FIGURE 8 is a partial vertical view of the front surface of the slab leg desk shown in FIGURE 5.

In FIGURE 5 it will be noted that the dust covers or boxes 5 have been omitted. Formed integrally with the member 10 are two downwardly turned rod bearing portions 30, 30, provided each with an opening 30′ through which rods, 7, 7, are disposed. Each rod has secured to it a downwardly depending member 32, as may be clearly apparent from FIGURE 7. A spring 31 is mounted at its respective ends to each of the members 32, and is so made as to tend to urge the members 32 towards each other, thereby keeping the slab leg clamps 6, 6 in tight engagement with the slab legs.

The modified apparatus just described is employed as follows. The telephone equipment is securely mounted on plates 4, 4. The apparatus is applied to the desk and to the slab legs by grasping handles 8, 8, and drawing them towards each other, thus expanding the spring 31 and lengthening the distance between the leg clamps 6, 6. The proper position is then determined and when the handles 8, 8 are released, the slab leg clamps 6, 6 move towards each other, under action of spring 31 which tends to become shorter and engage the leg 2. The spring is sufficiently strong to provide the needed drawing force upon the clamps 6, 6. Thus, the clamps are adjustably carried by and form a part of the rods 7, 7 and are urged into position by spring 31. The plates 4, 4, with the telephone equipment thereon are then adjusted to have a firm bearing against the desk panel 3.

What is claimed is:

1. A quick detachable equipment mounting device for use with a desk having two supporting slab legs extending throughout the width of said desk and below said desk and desk side panels disposed above and parallel to said slab legs, comprising a sheet metal horizontally disposed rectangular base member, a plurality of side plates supported upon said base member, each plate consisting of a vertical portion and a horizontally disposed portion integral therewith and being at a right angle to said vertical portion, downwardly disposed spaced rod carrying plates arranged at right angles to said base member transversely thereof, a rod common to each of said rod carrying plates and slidably carried by said plate, each of said rods being spaced parallel to said base member and projecting beyond each of said plates forming thereby one end portion constituting a slab leg clamp and a second end portion forming an operating handle, and a coiled spring mounted upon each of said rods to urge said desk slab leg clamp against said slab leg.

2. The device set forth in claim 1 in which there are two pairs of spaced downwardly disposed abutment plates arranged at right angles to said base member tranversely thereof, a rod common to each pair of said abutment plates and slidably carried by said plates, each of said rods being spaced parallel to said base member and projecting beyond each of said abutment plates forming thereby one curved end portion constituting a slab leg clamp and a second end portion forming an operating handle, a coiled spring mounted upon and surrounding each of said rods between said abutment plates and expansibly confined therebetween to pull said desk slab leg clamp against said slab leg, and a stop member disposed on each of said rods adjacent that abutment plate nearest to the operating handle end portion to confine said coiled spring between it and the abutment plate nearest to the slab leg clamp.

3. The device set forth in claim 1 in which said side plates will contact the desk panel to which they are adjacent upon completion of the attachment of said device to the ends of said slab leg.

4. The device set forth in claim 1 in which each of said slidable rods are aligned with each other and are disposed parallel to and beneath the longitudinal axis of said rectangular base member.

5. The device set forth in claim 1 in which the space that intervenes between said downwardly disposed rod carrying plates is occupied by the operating handles of said slidable rods.

6. The device set forth in claim 1 in which there are a pair of spaced downwardly disposed rod carrying plates arranged at right angles to said base member transversely thereof, a rod common to each of said rod carrying plates and slidably carried by said plates, each of said rods being spaced parallel to said base member, each rod projecting beyond its carrying plate forming thereby one curved end portion constituting a slab leg clamp and a second end portion forming an operating handle, a downwardly depending member secured to each of said rods and horizontally spaced from each other and from each of said rod carrying plates, and a coiled spring between and attached at its respective ends to said downwardly depending members and adapted to pull said downwardly depending members towards each other whereby the slab leg clamps are caused to engage the ends of said slab leg.

References Cited in the file of this patent

UNITED STATES PATENTS

| | | |
|---|---|---|
| 1,500,049 | Brooks | July 1, 1924 |
| 2,010,962 | Reinsberg | Aug. 13, 1935 |
| 2,881,924 | Kruse | Apr. 14, 1959 |
| 2,949,272 | Walls | Aug. 16, 1960 |